R. L. WILCOX.
SLOTTING MACHINE.
APPLICATION FILED MAY 11, 1910.
1,029,653.
Patented June 18, 1912.
6 SHEETS—SHEET 1.
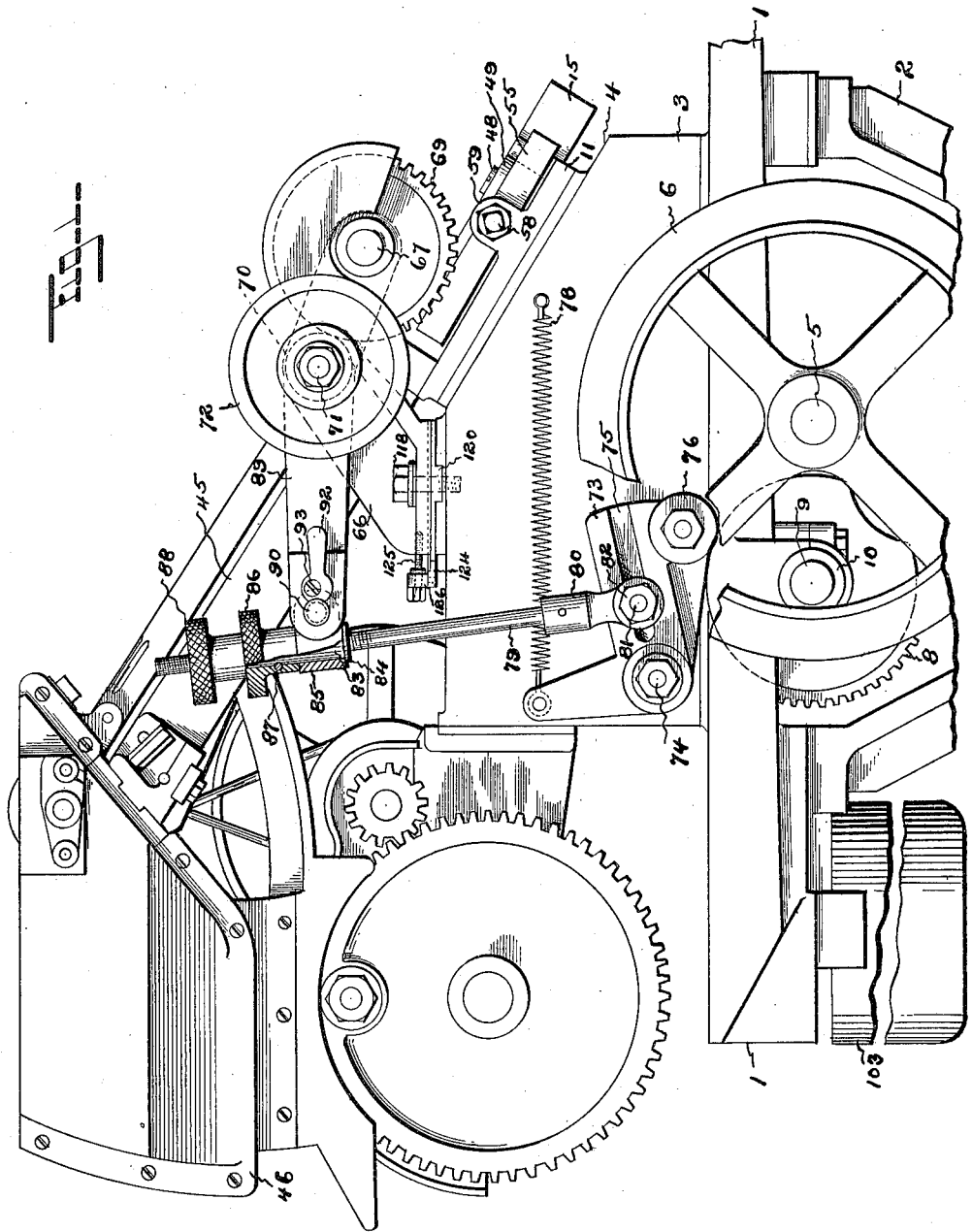
WITNESSES:
INVENTOR
ATTORNEY R. L. WILCOX.
SLOTTING MACHINE.
APPLICATION FILED MAY 11, 1910.
1,029,653.
Patented June 18, 1912.
6 SHEETS—SHEET 2.
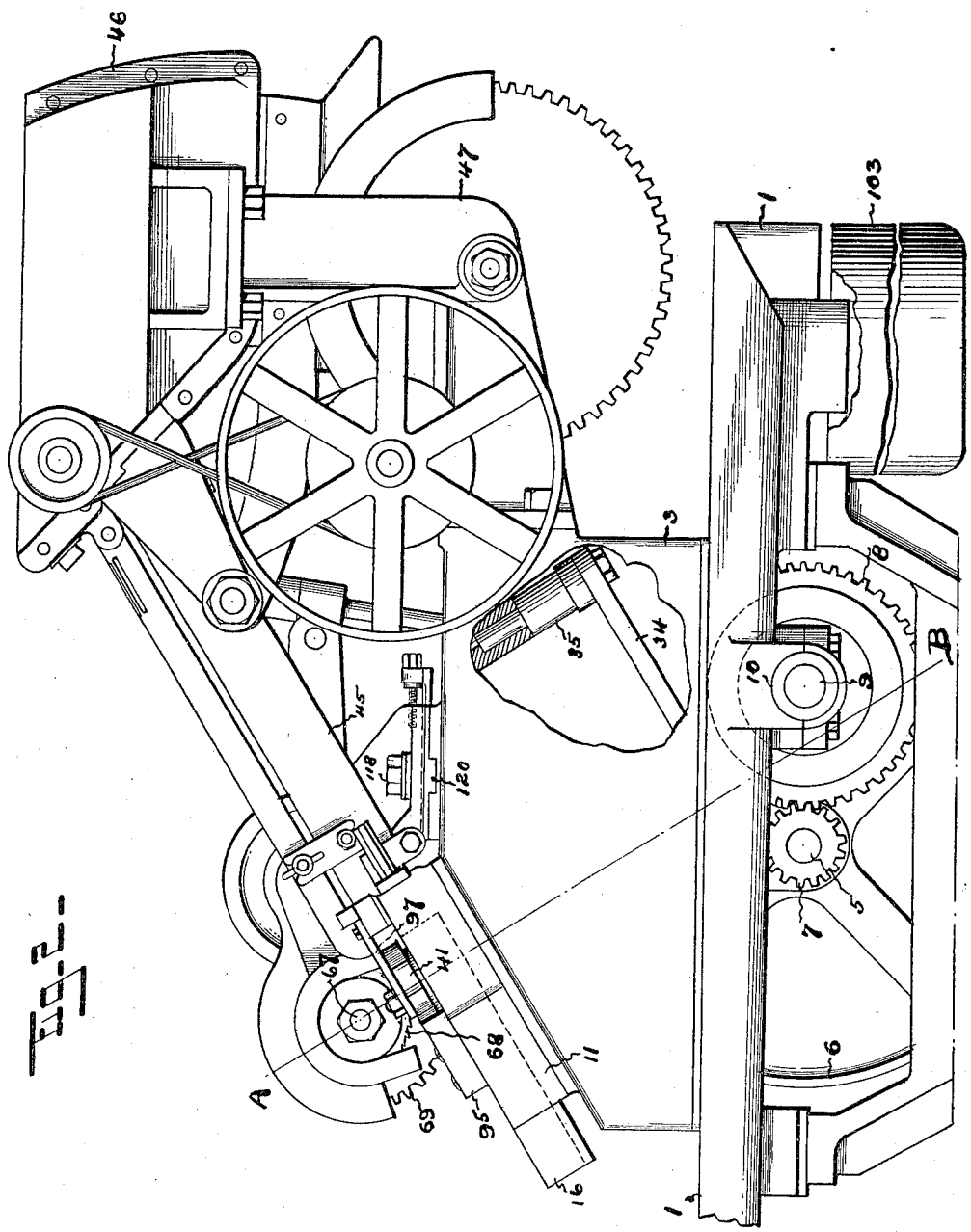
WITNESSES:
INVENTOR
BY
ATTORNEY R. L. WILCOX.
SLOTTING MACHINE.
APPLICATION FILED MAY 11, 1910.
1,029,653.
Patented June 18, 1912.
6 SHEETS—SHEET 3.
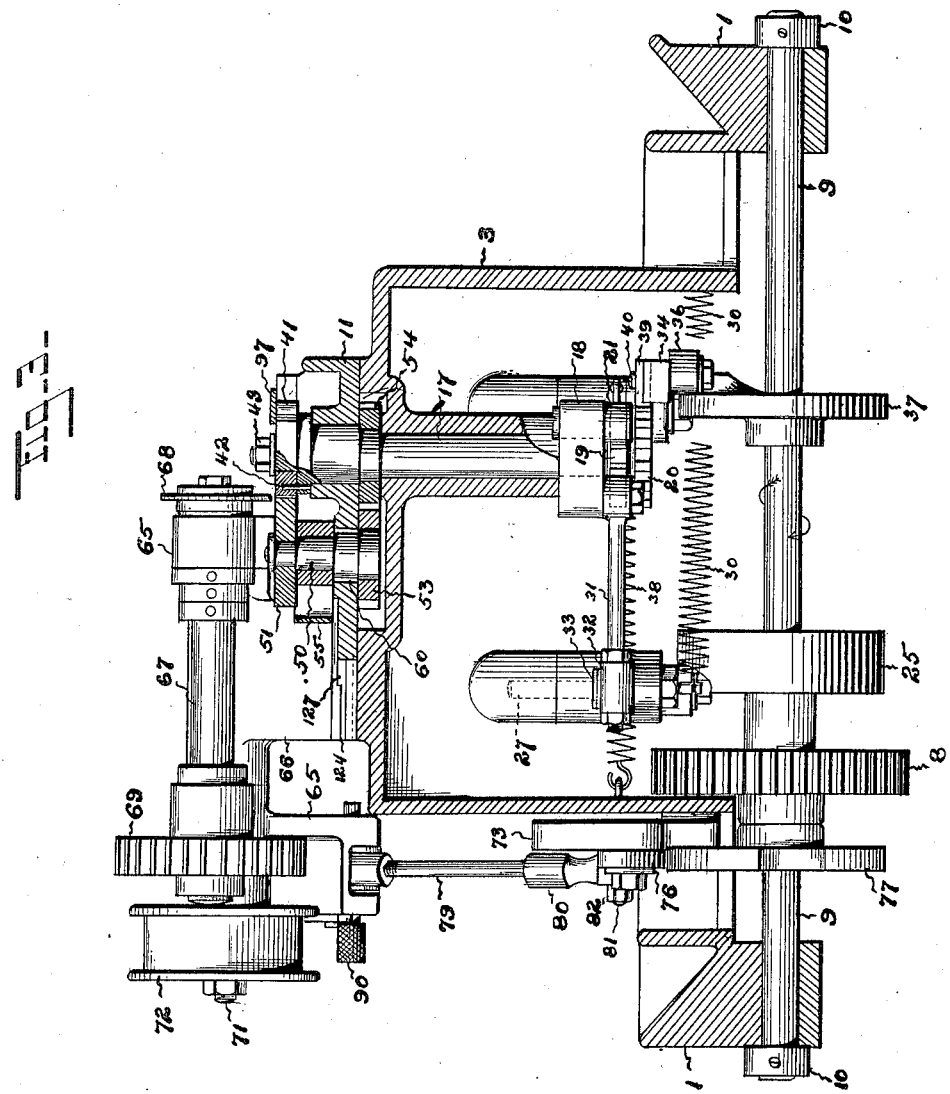
WITNESSES:
Florence H. Monk.
Wallace S. Moyle
INVENTOR
Richard Lester Wilcox
BY George H. Hall
ATTORNEY

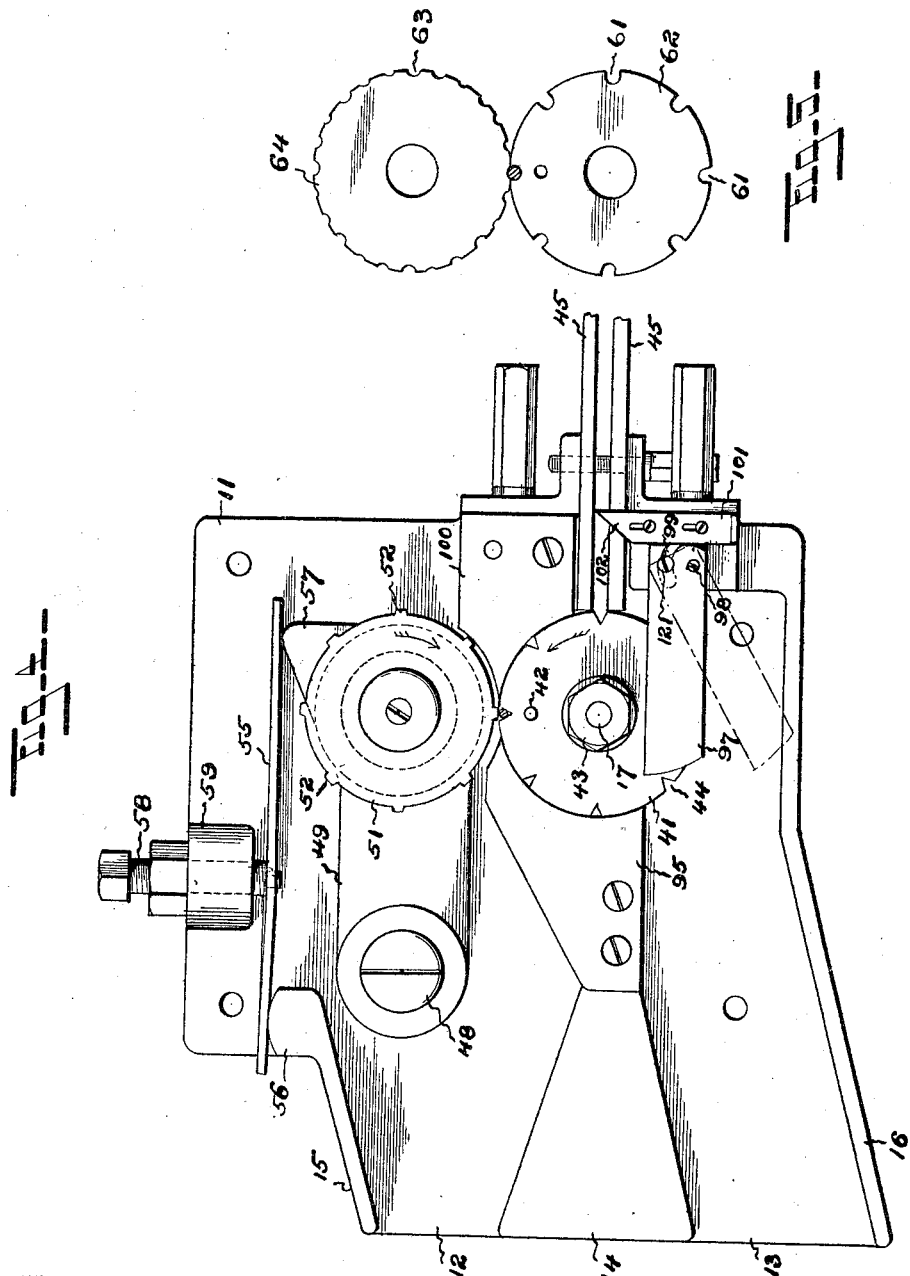

R. L. WILCOX.
SLOTTING MACHINE.
APPLICATION FILED MAY 11, 1910.
1,029,653.
Patented June 18, 1912.
6 SHEETS—SHEET 5.
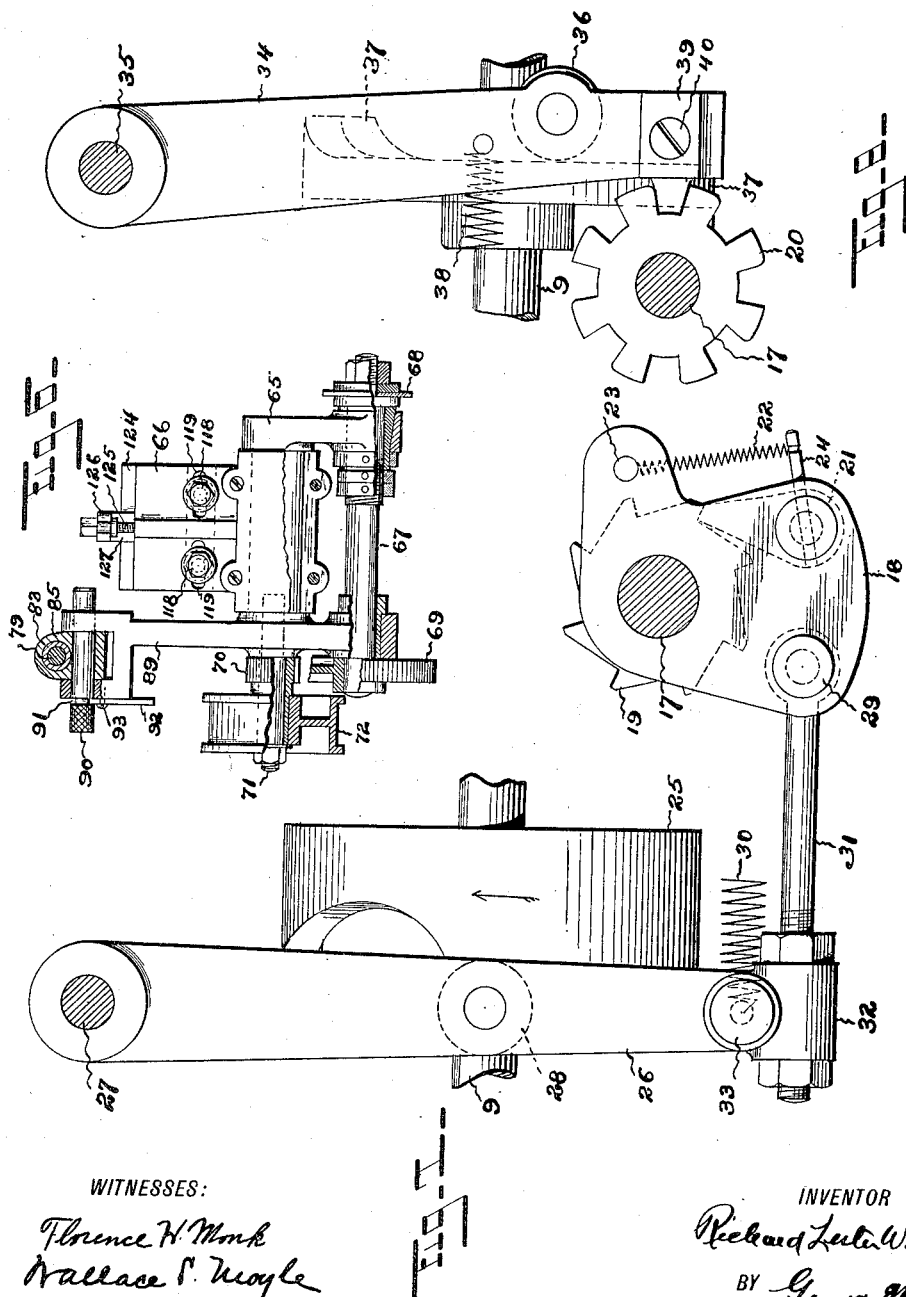
WITNESSES:
Florence H. Monk
Wallace S. Moyle
INVENTOR
Richard Lester Wilcox
BY
ATTORNEY

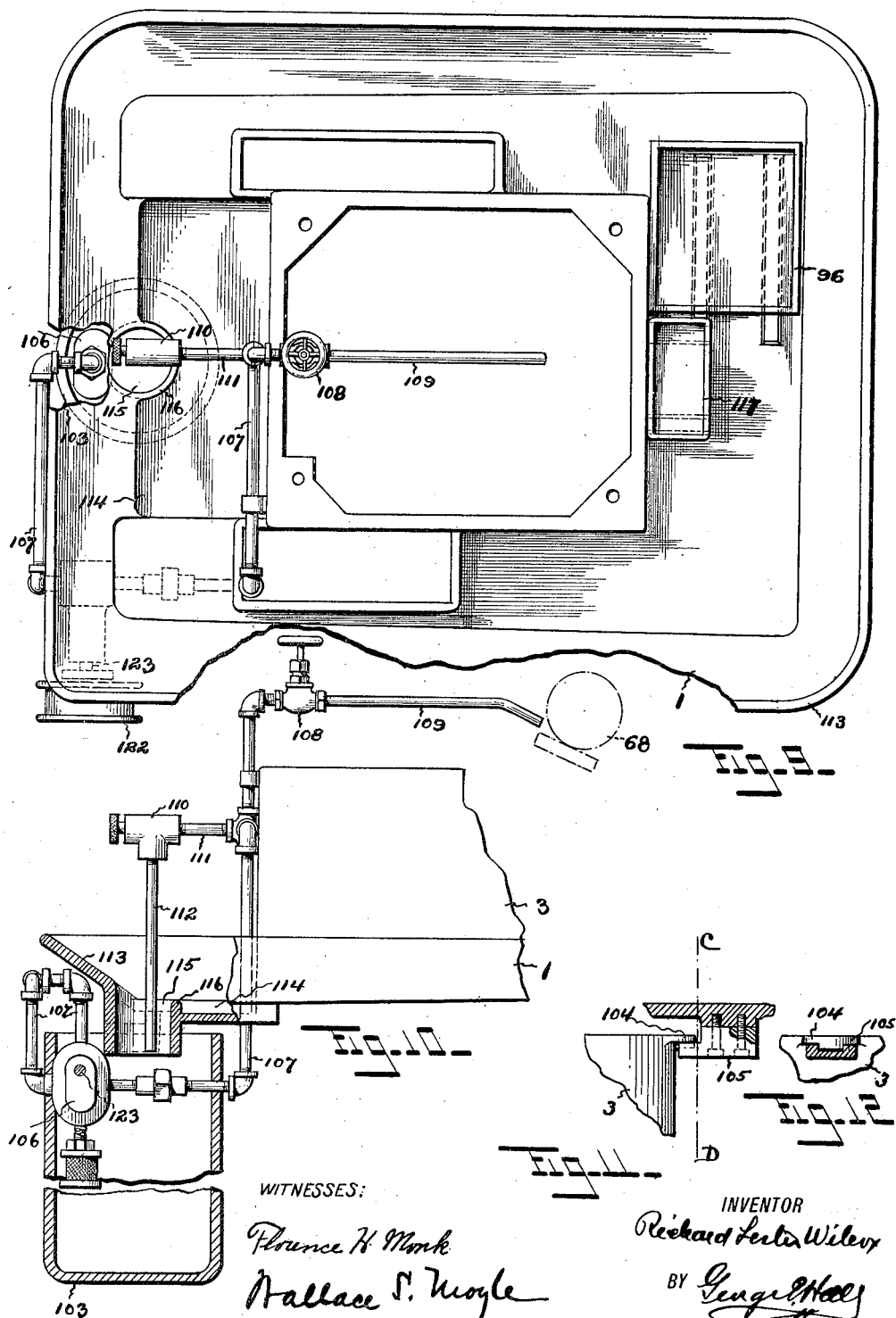

UNITED STATES PATENT OFFICE.

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

SLOTTING-MACHINE.

1,029,653.  Specification of Letters Patent.  Patented June 18, 1912.

Application filed May 11, 1910. Serial No. 560,708.

*To all whom it may concern:*

Be it known that I, RICHARD LESTER WILCOX, a citizen of the United States, residing at Waterbury, in the county of New Haven and State of Connecticut, have invented certain new and useful Improvements in Slotting-Machines, of which the following is a specification, reference being had therein to the accompanying drawings.

My invention relates to new and useful improvements in slotting machines, and has for its object, among other things, to provide a machine wherein the heads of screws, rivets, nipples, or similar articles, may be automatically slotted, and in the operation of the machine to convey the said articles by yielding mechanism, that will stop if the parts become disarranged or clogged, to the point where the saw performs its operation; to lock the holding mechanism against movement during the sawing operation; to mount the saw mechanism so that it may be conveniently adjusted for cutting slots of varying depths and moved out of its operating position when desired; means for automatically separating the chips from the articles operated on; and means whereby a supply of clean oil will be delivered to the saw and returned after the sawing operation to the source of supply, free and clear of chips or other foreign matter.

To these, and other ends, my invention consists in the slotting machine, having certain details of construction and combinations of parts, as will be hereinafter described and more particularly pointed out in the claims.

Referring to the drawings, in which like numerals of reference designate like parts in the several figures; Figure 1 is a side view of a slotting machine embodying my invention; Fig. 2 is a similar view from the opposite side of the machine; Fig. 3 is a sectional view of the machine taken upon the plane indicated by the line A—B of Fig. 2; Fig. 4 is an enlarged plan view of the dial bracket, dials and the mechanism adjacent thereto; Fig. 5 is a plan view of a modified form of carrier and gripping dials; Fig. 6 is a fragmentary plan view of the saw frame and adjacent parts; Fig. 7 is a plan view of a portion of the mechanism for imparting an intermittent rotary movement to the carrier and gripping dials; Fig. 8 is a plan view of the dial locking mechanism; Fig. 9 is a fragmentary plan view of the bed and the oiling system; Fig. 10 is a fragmentary side elevation of the mechanism shown in Fig. 9; Fig. 11 is a view of a portion of the mechanism for supporting the oil cup; and Fig. 12 is a sectional view thereof taken upon the plane indicated by the line C—D of Fig. 11.

In the embodiment of my invention I provide a bed 1, which is supported upon a suitable pedestal 2, and to which is secured the body 3 having an inclined face 4 thereon, and rotatably mounted therein is the shaft 5 having a driving pulley 6 and a pinion 7 thereon, which pinion meshes into the teeth of a gear 8 fixed on a shaft 9, also rotatably mounted in said bed, and having collars 10 upon each end thereof to prevent lateral movement thereof. Fixed upon the inclined face 4 of the bed 3 is the dial bracket 11, the lower edge of which is provided with two discharge openings 12 and 13 formed between the lug 14 and flanges 15 and 16. Rotatably mounted in the bracket 11 and body 3 is the dial spindle 17 having the pawl arm 18 rotatably mounted thereon and the ratchet disk 19 and locking disk 20 fixed thereto, said pawl arm having a pawl 21 pivotally connected therewith and held against the face of the ratchet disk 19 by the spring 22, which is connected with the pin 23 in the pawl arm, and the pin 24 fixed in the pawl (Fig. 6).

An intermittent rotary movement is imparted to said dial spindle from the shaft 9 by means of the dial cam 25, rock arm 26, pivotally mounted upon a stud 27 fixed in the body 3, having a roll 28 thereon which is held in contact with the face of the cam 25 by the spring 30 secured to said lever 26 at one end, and to the bed 3 at the other end (Fig. 3), a connecting rod 31 pivotally connected by the stud 29 with the pawl arm 18 at one end and at the other end adjustably secured with a swivel block 32 pivotally connected with the lever 26 by the stud 33. The action of the pawl arm 18, that imparts movement to the spindle 17, is caused by the pull of the spring 30, which is only sufficient to move the spindle when all the parts are working smoothly, hence said rotary movement will be stopped if perchance the dial mechanism, hereinafter described, should become clogged or disarranged. The return movement of the pawl arm 18, however, is positive and unyielding, against the action of the spring 30, through the rock arm 26 and connection rod 31. The spindle 17 is locked against rotation after each intermittent movement by means of a locking mechanism, which comprises a rock arm 34, pivotally connected to the body 3 by the stud 35, having a roll 36 thereon, which is held against the face of the cam 37, onto the shaft 9, by the spring 38, connected with the rock arm 34 and body 3; and a locking dog 39 fixed to the end of the rock arm 37 by a screw 40, the tooth of which is of substantially the same shape as the teeth of the locking disk 20.

Secured to the spindle 17, by the dowel pin 42 and nut 43, above the dial bracket 11, is the carrier dial 41 having a plurality of notches 44 in its periphery, corresponding in number with the teeth upon the ratchet disk 19 and locking disk 20. The hole in the disk 41 for the reception of the dowel pin 42 is located so that when the spindle 17 is in its rest position, one of the notches 44 will register with the opening between the plates 45 of the delivery chute, which connect with the hopper 46 secured to the body 3 by the bracket 47. Any type of hopper mechanism may be used with my improved machine, and the details thereof do not therefore constitute any part of this invention. Pivotally connected with the dial bracket 11 by the stud 48 is the dial arm 49, having rotatably mounted therein the spindle 50, upon the end of which is secured the gripping dial 51 having a plurality of projections 52 upon the periphery thereof, corresponding in number with the notches 44. Upon the spindle 17, below the dial 41, is the pinion 54, the teeth of which mesh into those on the pinion 53 on the spindle 50 and by which rotation is imparted thereto. The gripping dial 51 is normally moved toward the dial 41 by the spring 55, which bears at one end against a lug 56 on the bracket 11, and at the other end against a lug 57 on the arm 49, the tension of said spring being varied by means of the screw 58, threaded through the integral lug 59, and bearing against said spring (Fig. 4). To accommodate the lateral movement of the arm 49, the opening 60 in the bracket, through which the spindle 50 passes, is somewhat larger than said spindle (Fig. 3).

The dials 41 and 51 are preferably used for work having a smooth shank, but where the shank is threaded, and in order not to bruise or mar the thread, I prefer to use the dials shown in Fig. 5, wherein the radial notches 61 of the carrier dial 62 are rounded at their bottom ends, as are also the notches 63 on the gripping dial 64. To enable these latter dials to be used upon work of varying diameters, the notches 64 are of different depths, and arranged in series, so that every fourth notch is the same depth.

The saw mechanism comprises a saw frame 65, which is journaled in the bracket 66 fixed to the body 3, with a plate 124 therebetween, having a spindle 67 rotatably mounted therein and carrying the saw 68 and gear 69, which meshes into a pinion 70 rotatably mounted upon a stud 71 fixed in the frame 65, and connected therewith is a driving pulley 72; a rock arm 73, that is mounted upon a stud 74 fixed in the body 3, having a slot 75 therein, and carrying a roll 76 which is held against the face of the cam 77 by the spring 78 (Fig. 1); a connecting rod 79, having a head 80 at one end, and which is adjustably secured to the rock arm 73 by the stud 81, the head of which rides in the slot 75, and having a nut 82 thereon; an internally threaded sleeve 83 threaded on the connecting rod 79, having a head 84 thereon; a knurled collar 86 fixed to said sleeve by the pin 87; a swivel block 85 upon said threaded sleeve between the head 84 and the knurled collar 86; a knurled hand nut 88 threaded upon the rod 79; and a pin 90 for separably securing the swivel block 85 to the arm 89 upon the saw frame. Near one end of this pin is an annular groove 91, into which projects the head of the locking plate 92 that is eccentrically secured to the arm 89 by the screw 93. Rotation of the locking plate 92 upon the screw 93 will move the head of said plate into or out of the groove 91, according to the direction of its movement, thus affording a convenient and safe means for locking the separable connection between the saw frame and swivel block. The rotating saw is adjusted toward and away from the carrier and gripping dials so as to vary the depth of the slot by rotation of the threaded sleeve 83 upon the connection rod 79, through the knurled collar 86, and locked in its adjusted position by the knurled hand nut 88. A slight adjustment of the saw, at a right angle to its axis, is provided for by mounting the bracket 66 upon the plate 124, and moving the same thereon through the screw 125, that is held against endwise movement by the lug 126, and threaded into said bracket. The plate 124 is provided with a tongue 120, upon its under surface, that projects into a groove in the bed 3, which permits of an adjustment of said bracket parallel to the axis of said saw, and upon its upper surface with a tongue 127 that projects into a groove in the under-side of the bracket 66. The bracket 66 and plate 124 are secured to the body 3 in any of their relative adjusted positions by the screws 118 which pass through the slots 119 in the said bracket and plate. If it is desired to move the saw away from the dials for any reason, the saw frame is disconnected from the connection rod 79 by withdrawing the pin 90 and swinging the saw frame upon its journal out of the way, which is done without affecting the operation of any of the other parts of the machine.

In operation, the blanks are automatically delivered to the chute mechanism from the hopper 46 and successively enter the notches 44 in the carrier dial 41 as they register therewith. The dial cam 25 is so timed that as a blank enters one of these notches a partial rotation is imparted to the spindle 17, and through it to the carrier dial 41 and gripping dial 51. Successive movements of the carrier dial convey the blanks to the position, shown by the section of the blank designated 94, in Figs. 4 and 5, at which time one of the projections 52 upon the gripping dial will register with one of the notches 44 and contact with the blank which is held against the bottom of the said notches by the action of the spring 55, which spring is sufficiently strong to hold the blank against rotation during the sawing operation. The relative operation of the dials 62 and 64 is the same as above described for the dials 41 and 51. Instantly the blanks are brought into the above position the saw frame 65 is actuated, to cut the slot, and then withdrawn, when another advance movement is imparted to the spindle 17, and the operations continued as before. While being conducted from the chute mechanism into position for the sawing operation the blanks are held within the notches 44 by the plate 100 fixed to the bracket 11, and after the sawing operation, are held therein by the plate 95 until the slotted blank passes beyond said plate, when it drops by gravity out of the carrier dial and enters the receiving pan 96 as a finished product through the discharge opening 13. If perchance the blank should not drop out of the carrier dial, as above described, the stripper plate 97 will force it out during the further rotation of said dial. This stripper plate is pivotally connected with the bracket 11 by the screw 98 and provided with a circular slot 99, whereby it may be moved upon its pivot mounting and held in this position by the screw 121, so as to uncover the carrier dial, as shown by broken lines in Fig. 4.

To shut off the supply of blanks from the chute I have provided a stop plate 101, which has a lateral movement upon the bracket 11 across the opening between the plates 45. The inward position of this stop plate is shown in Fig. 4 with its pointed end 102 lying across the chute plates and holding in check the blanks in the chute, which are immediately released upon the withdrawal of said stop plate.

My improved system for supplying oil to the saw, free and clear of chips, comprises a cup 103, suspended below the bed 1 by the lugs 104, which rest within the plates 105, secured to the said bed, the open space between the said cup and bed being sufficient to permit of the ready removal of said cup by lifting the same to clear the lugs 104 from the plates 105; a pump 106 operated by the rotation of a pulley 122 upon the pump shaft 123; a valve 108; pipes 107 connecting the said valve with said pump; a discharge pipe 109 projecting from said valve to a point adjacent to the saw 68 (Fig. 9); a check valve 110 connected to the pipes 107 by the pipe 111 and having a pipe 112 fixed therein, which terminates above the cup 103. The bed 1 is surrounded by an inwardly flaring flange 113, and the top thereof inclines from the front to the rear, where there is a reservoir 114 adjacent to an opening 115 in the bed that is surrounded by a flange 116. As above mentioned, the pan 96 rests upon the bed 1 opposite the discharge opening 13 in the bracket 11 and receives the finished blanks, and opposite the discharge opening 12 is a chip pan 117, to receive the chips as they drop from the opening 12. The oil from the pipe 109 drops on the blank during the sawing operation and washes the chips therefrom onto the bracket 11, and the oil with the chips is discharged through the opening 12 into the pan 117. After this pan is filled with oil it overflows, leaving the chips in the bottom thereof. This overflow oil drops onto the top of the bed 1 and runs into the reservoir 114, washing with it any chips that may happen to have overflowed from the pan 117 or fallen onto the bed. When the reservoir 114 is filled, the oil enters the cup 103 through the opening 115, the oil at this time being clean and free from chips, which are held within the pan 117 and reservoir 114. The oil is again delivered to the saw 68 by the action of the pump 106. If it is desired at any time to shut off the supply of oil at the saw, the valve 108 is closed, and the oil will thereafter flow through the pipes 107 and 111, through the valve 110 and pipe 112, back into the cup, the stem in the valve 110 being held on its seat with a spring pressure to prevent the oil passing therethrough when the valve 108 is open, but being moved off its seat if said valve should be closed.

There are minor changes and alterations that can be made within my invention, aside from those herein suggested, and I would therefore have it understood that I do not limit myself to the exact construction herein shown and described, but claim all that falls fairly within the spirit and scope of my invention.

Having described my invention, what I claim as new and desire to secure by Letters Patent, is:—

1. In combination; an operating tool; a delivery chute; a carrier dial, having blank receiving means thereon; a gripping dial, both of said dials lying in a plane at an angle to both the horizontal and vertical, with their lower ends away from said delivery chute; means for imparting an intermittent rotary movement thereto, so that during the rest periods of said dial, one of said blank receiving means will register with said chute; and two discharge chutes, for separating the oil and chips and the finished work as delivered from said dials.

2. In combination; an operating tool; a delivery chute; a carrier dial, having blank receiving means thereon; a gripping dial, both of said dials lying in a plane at an angle to both the horizontal and vertical, with their lower ends away from said delivery chute; means for imparting an intermittent rotary movement thereto; and two discharge chutes for separating the oil and chips and the finished work as delivered from said dials.

3. In combination; a delivery chute; a carrier dial, having peripheral blank carrying means; a gripping dial, having peripheral blank holding means; means for intermittently rotating said dials so that one of the said blank carrying means of the carrier dial will register with the holding means in the gripping dial, and another of said blank carrying means will register with said chute, when said dials are in their rest positions; yielding means for moving one of said dials toward the other; and two discharge chutes for separating the oil and chips and the finished work as delivered from the said dials, said chutes being so arranged that one of said dials is in line with one of said chutes and the other dial in line with both of said chutes.

4. In combination; an operating tool; a fixed part, having two discharge chutes leading therefrom; a carrier dial, with blank receiving means thereon, mounted in said fixed part and rotatable in a path at an angle to both the vertical and horizontal, with points upon its periphery diametrically opposite each other in line with each of said discharge chutes; a delivery chute arranged to successively deliver blanks by gravity into the blank receiving means of said carrier dial; a gripping dial rotatable in the same plane as said carrier dial and in line with only one of said discharge chutes; and means for imparting an intermittent rotary movement to each of said dials.

In testimony whereof I affix my signature in presence of two witnesses.

RICHARD LESTER WILCOX.

Witnesses:
Geo. F. Byam,
W. B. Davis.

---

Copies of this patent may be obtained for five cents each, by addressing the "Commissioner of Patents, Washington, D. C."